United States Patent
Daniels et al.

(10) Patent No.: US 7,346,607 B2
(45) Date of Patent: Mar. 18, 2008

(54) SYSTEM, METHOD, AND SOFTWARE TO AUTOMATE AND ASSIST WEB RESEARCH TASKS

(75) Inventors: Fonda J. Daniels, Cary, NC (US); David B. Kumhyr, Austin, TX (US); Dustin C. Kirkland, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 10/847,605

(22) Filed: May 17, 2004

(65) Prior Publication Data

US 2005/0262052 A1    Nov. 24, 2005

(51) Int. Cl.
*G06F 17/30* (2006.01)
*G06F 17/00* (2006.01)

(52) U.S. Cl. .......................... 707/3; 707/102
(58) Field of Classification Search ................ 707/1–3, 707/9, 10, 102
See application file for complete search history.

(56) References Cited

U.S. PATENT DOCUMENTS

| | | | |
|---|---|---|---|
| 6,947,924 B2* | 9/2005 | Bates et al. ..................... | 707/3 |
| 2002/0194161 A1* | 12/2002 | McNamee et al. ............. | 707/2 |
| 2003/0037074 A1* | 2/2003 | Dwork et al. ................ | 707/500 |
| 2005/0138122 A1 | 6/2005 | Boehringer et al. | |

FOREIGN PATENT DOCUMENTS

KR    2002020432 A  *  3/2002

OTHER PUBLICATIONS

Jacovi et al, "Why Do We Reach Out? Functions of a Semi-persistent Peer Support Tool", ACM 2003, pp. 161-169.*
Internet website: www.pluck.com, 4 pages printed from the Internet on Jun. 14, 2004.
U.S. Appl. No. 09/163,643, filed Sep. 30, 1998. "Organizing and Categorizing Hypertext Document Bookmarks by Mutual Affinity Based on Predetermined Affinity Criteria." Bates et al.

* cited by examiner

*Primary Examiner*—Uyen Le
(74) *Attorney, Agent, or Firm*—Coats & Bennett, P.L.L.C.

(57) ABSTRACT

A web browser plug-in supports a team approach to Internet research. An initial search, preferably by a web robot, generates an initial plurality of potentially relevant URLs, which are stored in a shared URL database. Team members are notified when new URLs are added to the database. Team members, optionally through an access control system, evaluate and rank the URLs for relevance. URLs are managed based on their rank, such as ordering their display and deleting non-relevant URLs. The rank of a URL may be indicated visually in a web browser, such as by displaying graphic icons adjacent its title. The method may be iterative, with additional searches conducted, preferably via additional web robots, with the additional URLs returned being evaluated, ranked, and managed in the URL database.

21 Claims, 3 Drawing Sheets

SYSTEM, METHOD, AND SOFTWARE TO AUTOMATE AND ASSIST WEB RESEARCH TASKS

BACKGROUND

The present invention relates generally to the field of web browser software and in particular to a plug-in for a web browser that facilitates Internet research by a team.

The Internet, and in particular the World Wide Web of the Internet, contains a wealth of information and is a natural target for a wide range of research. The typical process for conducting research on the Internet involves launching multiple searches on a search engine, and generating lists of Uniform Resource Locaters (URLs) that can easily run to the thousands. As well known in the art, each URL identifies a particular web site, which a user can view via a web browser. The extensive list of URLs returned from the search engines must be laboriously followed, viewing the information on each associated web site and eliminating the link or possibly following further links in an attempt to develop good information sources.

A researcher may save some URLs, such as using a browser's ability to save "bookmarks" or "favorites." Additionally, many web browsers provide rudimentary tools for organizing and managing a list of URLs, such as by arranging them in a hierarchal tree structure, and renaming the URL to a more descriptive title. The researcher may revisit previously viewed web sites to obtain updated information. In an attempt to enable or facilitate a team-based approach, a researcher may e-mail one or more URLs to other users. In general, the traditional Internet based research process is highly fragmented, disorganized and time consuming, and forces the researcher to switch between modes of finding resources and modes of evaluating and assimilating data from the resources in a disorganized manner.

SUMMARY

The present invention relates to a method of conducting Internet research on a topic by a team. In one embodiment, a preliminary automatic search is launched to generate a preliminary list of URLs related to the topic. The URLs are automatically made available to members of the team via a shared URL database. The team members are automatically notified when new URLs are added to the shared URL database. Team members evaluate and rank the URLs for relevance to the research topic. Non-relevant URLs are automatically deleted. Subsequent automatic searches may be launched to generate additional URLs, and the steps of making available, notifying, evaluating and deleting are repeated with respect to the additional URLs.

In another aspect, the present invention relates to a plug-in for a web browser to facilitate Internet research on a topic by a team. The plug-in includes a web search robot configuration and management facility operative to generate, launch, manage, and terminate one or more web robots to search the Internet and to return URLs according to predetermined criteria. The plug-in additionally includes a shared URL database accessible by members of the team and operative to store the returned URLs. A URL evaluation and ranking facility is operative to assign each URL in the shared URL database a rank based on the relevance of the URL to the research topic. A team notification facility is operative to notify the team members when new URLs are added to the shared URL database.

DETAILED DESCRIPTION

The present invention relates to an Internet research methodology that utilizes automated tools, such as a web browser plug-in, to automate many of the phases or tasks of the research process. The research methodology is particularly suited to a team-based research effort. The methodology and browser plug-in are described with respect to web sites and the World Wide Web, but are not so limited. As known in the art, URLs identify many Internet resources other than web sites, and accessing such resources is included in the scope of the present invention.

As well known in the art, a browser plug-in is a software module that may be optionally integrated with a web browser to add features and functionality that is not a native part of the browser application. Once integrated, or "plugged into" the browser application, the additional features and functionality are available to the user, and are often indistinguishable from the browser's native features and functionality. For example and without limitation, plug-in's may add features such as menus or menu entries, buttons, text entry fields, "pop-up" windows and menus and the like, and may add functionality such as audio/video processing and display, translation, execution engines for running applets programmed in various languages, and the like. According to embodiments of the present invention described herein, a plug-in may add to a web browser the ability to create and launch web robots (including, in one embodiment a wizard to simplify the process), manage a shared URL database, perform access control over edits to the shared URL database, automatically manage and delete shared URL database entries, and provide notification and/or other communication capabilities between different instances of web browsers.

Figure 1:
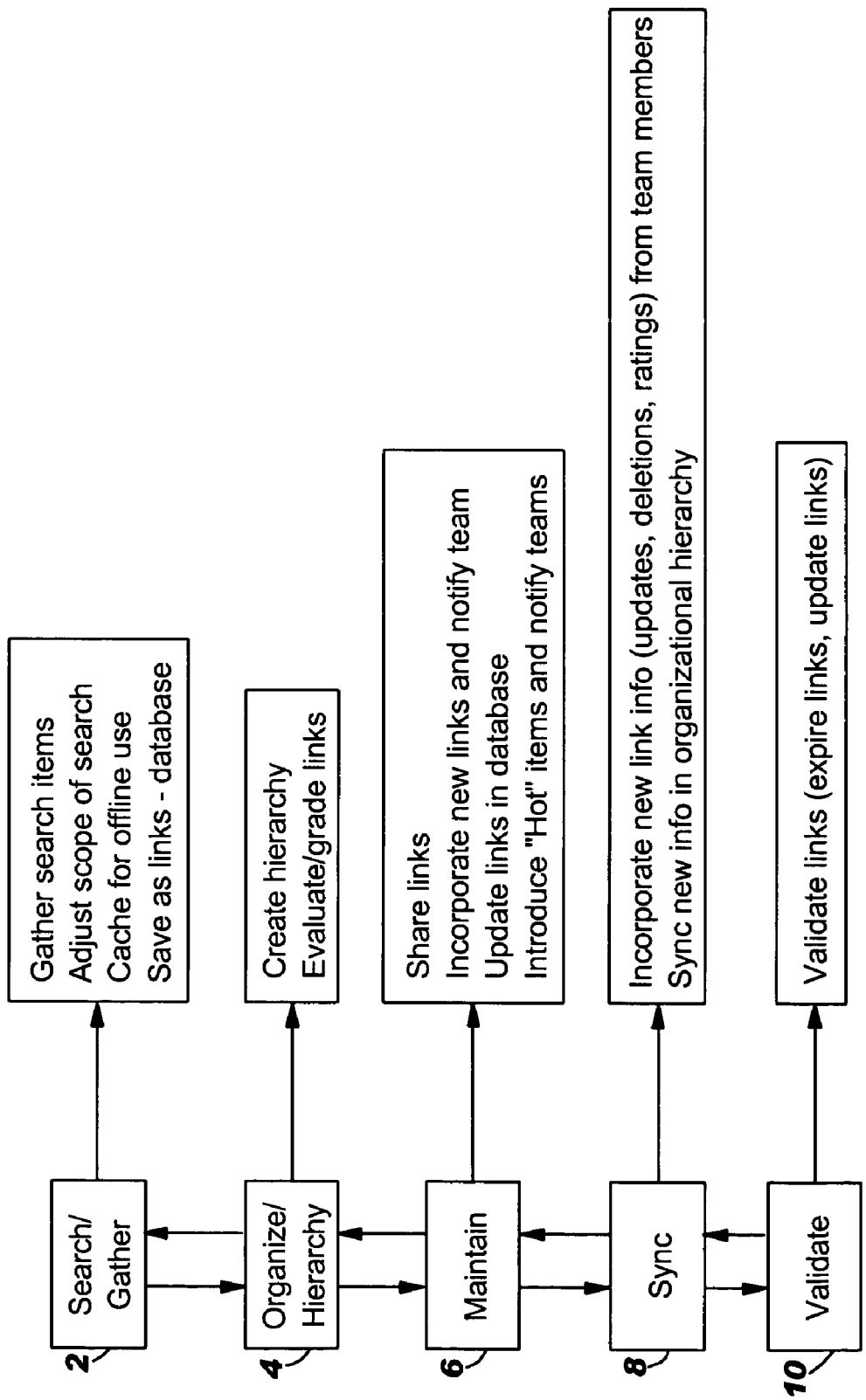
FIG. 1 is a diagram of an idealized workflow for Internet research.

FIG. 1 depicts the phases of an idealized Internet research workflow. The process begins at block 2, a search/gather phase. During this phase, initial searches are performed and the scope of the search is refined. Links may be followed and evaluated immediately, or stored, such as in a database or file system, for future use and evaluation. Ideally, in addition to URLs, some associated web sites are cached, allowing their content to be perused and evaluated offline.

The next phase in the process, indicated at block 4, is to organize discovered URLs into a useful structure, such as a hierarchy. As part of the organization process, the URLs may be followed and their associated web sites evaluated. This evaluation may result in assigning a grade or rank to the URLs.

A further phase of the process, indicated at block 6, is to maintain the URL database. The URLs are preferably maintained in a shared database, whereby all members of the research team may access the same URLs. New URLs are incorporated into the database as they are generated by ongoing search activity, and team members are notified. Ongoing maintenance includes updating URLs in the database, identifying particularly relevant URLs, notifying team members of their presence.

Note that, as indicated in FIG. 1, the various phases of the idealized research process are somewhat interactive and concurrent. For example, new searches (block 2) may be ongoing, with the concomitant need to organize the newly discovered URLs (block 4), while the database maintenance functions (block 6) are ongoing.

Another phase in the process, indicated at block 8, is to periodically synchronize the research effort. This may involve incorporating information from newly discovered links into the overall research structure and direction, which may alter the scope or direction of the research. Such redirection may render some existing URLs less relevant, prompting their deletion from the database, and similar activity.

Additionally, as indicated at block 10, a validation process is necessary to periodically validate the URLs in the database. As is well known in the art, the Web is a dynamic structure, and links often change, expire, and become more or less relevant as the corresponding web site content changes over time.

Figure 2:
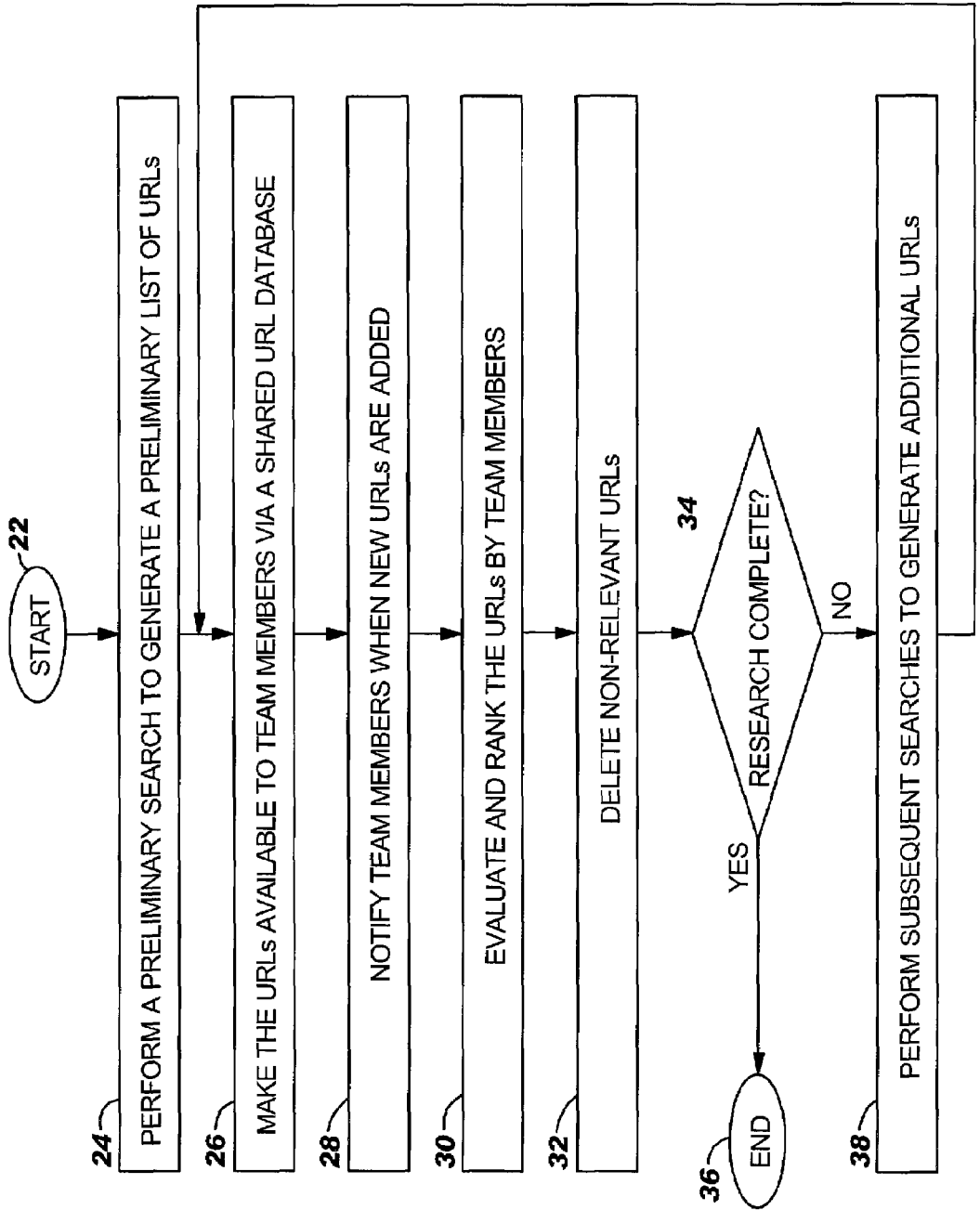
FIG. 2 is a flow diagram of a method of performing Internet research.

The workflow depicted in FIG. 1 is idealized and in the abstract. FIG. 2 depicts, in flow diagram format, a method for performing Internet research according to the present invention. Starting with block 22, a preliminary search is initially performed to generate a preliminary list of URLs, at block 24. The preliminary search is preferably performed automatically, and is most preferably performed using a web robot. Web robots, variously known in the art as bots, spiders, crawlers and the like, are software programs that automatically follow links in web pages, performing predetermined actions according to predetermined criteria. In particular, according to the present invention, a web robot searches the World Wide Web and other aspects of the Internet for content related to a research topic, as indicated for example by search terms, phrases, and the like.

The web robot may be provided one or more (seed) URLs, or alternatively may access one or more web search engines, supplying search terms to generate a list of seed URLs. The web robot may then follow the URL links, automatically evaluating each associated web site according to predetermined criteria programmed into the web robot. For example, the number of times a search term is repeated on a web site, the relative position of one or more search terms, the relative proximity of two or more search terms or phrases, and the like are examples of criteria by which the web robot may evaluate a web site. In the simplest case, the web robot may perform little or no evaluation, and merely harvest a list of potentially relevant URLs. Preferably, the web robot screens each web site, and returns a list of URLs of web sites deemed relevant according to the screening criteria. As is well known in the art, the behavior of the web robot, such as how often or quickly it follows links, how long it remains active, and the like, may be specified by the robot's creator, in this case the researcher.

In one embodiment, some or all parameters of the web robot that control the scope of the search it conducts may be predetermined. For example, the present invention may find utility in a school project, where the starting point and/or the scope of allowable resources to be searched may be predetermined, such as by the teacher or project coordinator.

The URLs returned by the web robot are then made available to all members of the research team via a shared URL database, as indicated at block 26. The shared URL database may comprise a database system such as Microsoft Access, Oracle or other commercially available or custom-designed database. Alternatively, the shared URL database may comprise a directory structure on a shared file system, wherein all web browsers used by the research team members may access the same shared directory structure. Other possible implementations for the shared URL database may be easily derived by those of skill in the art, and would fall within the scope of the present invention.

The database is shared in the sense that all team members have read access the URLs in the database, to direct their respective web browsers to the associated web sites. In one embodiment, one or more team members may have edit access to the shared URL database, for the purpose of evaluating, ranking and otherwise maintaining the URLs. This situation is similar to the well-known problem of a plurality of programmers collaboratively developing software, for which access control methodologies and tools of varying sophistication are well known, such as for example the Source Code Control System (SCCS) of the UNIX operating system. Such assess control may form a part of the browser plug-in of the present invention, or alternatively may be part of a separate database management system.

According to the present invention, team members are notified as new URLs are added to the shared URL database, as indicated at block 28. This notification may be in the form of an electronic message automatically sent to all or a selected subset of team members. The electronic message may comprise an e-mail message, and instant messaging message, a cellular telephone text message, or other electronic message as known in the art. Alternatively, the web browser plug-in may include communication facilities whereby a team member's browser will notify him of new URLs in the shared database, such as by replacing the "home" URL with a link to HTML code specifying the latest additions, a JAVA Applet executing on the team member's web browser alerting him to the new URLs, or the like. A broad variety of inter-web browser communications functions are known and may be implemented by those of skill in the art, within the scope of the present invention.

While a web robot may be able to perform primitive evaluation of a web site, for example based on a count of search terms and phrases, human evaluation of the relevance of the web site to the research topic remains desirable. According to one embodiment of the Internet research method of the present invention, this task is distributed to team members, preferably with each team member assuming responsibility for a subject matter category or other defined portion of the research task. As depicted in block 30, team members evaluate the web sites associated with the URLs in the shared URL database, and rank the URLs in terms of their relevance. This may include accessing the shared URL database via the access control method discussed above. In one embodiment, team members rank URLs by assigning them a number, such as from zero to five. In one embodiment, the display of the URLs in team member's web browser is accompanied by zero or more graphic icons, such as stars, corresponding to the rank assigned to the URL. In this manner, other team members may readily ascertain the most relevant URLs in the shared database, as determined by the human evaluator, by noting the number of stars displayed with each URL.

A variety of automated acts may be keyed off of a URL's rank. For example, other team members may be notified when a URL is ranked at or above a predetermined relevance level, such as receiving four or five stars. Additionally, as indicated at block 32, URLs whose rank falls below a predetermined threshold, such as zero, one or two stars, may be automatically deleted from the shared URL database. For URLs deleted from the shared URL database (either automatically or manually), the URL, a hash of the web page to which the URL resolves, or some other identifier may be retained in a "negative match" database, against which future search results are automatically compared. This may prevent the same non-relevant URLs from being repopulated in the shared URL database on future searches.

If the research is complete, as indicated in block 34, then the method ends at block 36. More likely, several iterations of launching searches and evaluating and managing returned URLs will be required. As indicated in block 38, subsequent searches may be launched, perhaps having a more refined or in-depth scope. Preferably, according to the present invention, the subsequent searches are performed by launching web robots, preferably from a web robot creation and management facility in a browser plug-in. The subsequent searches generate additional URLs, which are subsequently entered into the shared URL database (block 26), team members notified (block 28), the URLs evaluated and ranked by team members (block 30), and the URLs deemed not relevant deleted (block 32). This process may iterate a number of times prior to the research being deemed complete (block 34), when the method terminates (block 36).

Figure 3:
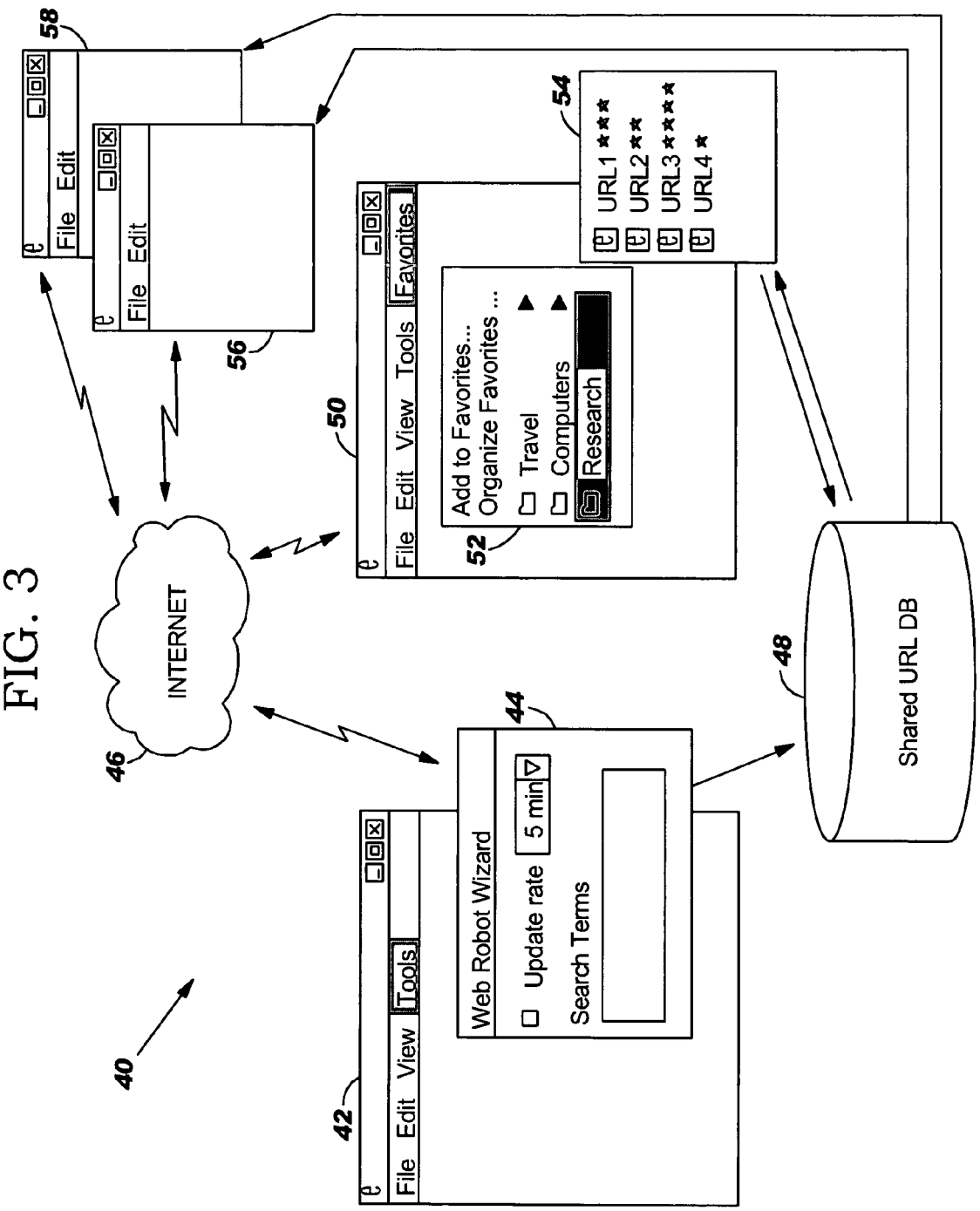
FIG. 3 is a functional block diagram of a plurality of web browsers involved in team Internet research.

FIG. 3 depicts a functional block diagram of a system to implement the method of FIG. 2, indicated generally by the numeral 40. The research process begins with a user accessing a web browser 42 that preferably includes a team Internet research plug-in according to the present invention. One aspect of the plug-in may be a web robot wizard 44. As known in the art, a "wizard" is an interactive program module, such as in a pop up window, that provides a simplified user interface to an application's functionality, by walking the user step-by-step through a process, typically prompting for and soliciting input from the user along the way, and perhaps explaining options and making recommendations. The web robot wizard 44 may prompt the user for robot management information, such as a time delay between accessing successive URLs, the total number of URLs to be returned, the robot's life span, and the like. The web robot wizard 44 may additionally prompt the user for information controlling the robot's behavior, such as search terms and phrases, domain restrictions, search strategies, criteria by which to evaluate web sites discovered, and the like.

Upon completion of the creation of a web robot—either through the web robot wizard or alternatively by directly accessing a web robot creation tool in the browser plug-in and entering relative parameters—the web robot accesses the Internet 46 to perform the indicated search. URLs returned by the web robot (i.e., those associated with web sites deemed relevant according to the web site evaluation criteria programmed into the web robot) are stored in the shared URL database 48.

As discussed above, the shared URL database 48 may comprise a separate database or a directory structure on a shared file system. In either case, all web browsers 42, 50, 56, 58 used by the research team members have at least read access the shared URL database 48.

As the web robot deposits URLs into the shared URL database 48, a team member assigned to evaluate and rank at least some of the URLs may access a web browser 50 that includes a plug-in according to the present invention. The user may access the favorites or bookmarks management facility 52, which may include a facility 54 for managing the URLs in the shared URL database 48. The URL management facility 52 may include access control functionality, as discussed above. The user may utilize the web browser 50 to access the Internet 46 to view and evaluate the web sites associated with the URLs. Following this review, the team member may assign each URL a rank indicative of its relevance to the research topic or sub-topic under evaluation.

In one embodiment, the rank comprises a numeric value, such as in the range from zero to five, and the rank is indicated in the browser URL display 54 by graphic icons positioned adjacent the URL title. For example, a URL may have from zero to five stars displayed next to its title, indicating its assigned rank.

The rank assigned to a URL is preferably maintained in the shared URL database 48 as an attribute of the URL. This allows the shared URL database 48 management system, which may comprise a browser plug-in, to utilize the URL's rank in its management functions. For example, the display of URLs may be automatically ordered according to rank, such as with the highest-ranking URLs appearing first in any display of URLs. Additionally, the shared URL database 48 management system may automatically delete or remove URLs having a low rank, such as for example URLs with a rank zero, one or two. Both the automatic management of URLs according to rank, and the visual indicator of a URL's rank in its browser display 54, assist other research team members in accessing only the most relevant information, saving time and increasing team efficiency.

Other team members may access the shared URL database 48 to retrieve relevant URLs, and access the Internet 46 to view the associated web sites, such as in web browsers 56, 58, to perform research and extract information from the web sites. While the web search, URL database management, URL evaluation and ranking, and research functions have been explicated herein as performed by different team members, utilizing different web browsers 42, 50, 56, 58, the present invention is not so limited. While the present invention includes facilities amenable to the division of labor among team members, all of the described functions may be performed by a single researcher, utilizing a single browser with a plug-in having the appropriate functionality. Alternatively, the research tasks may be divided among team members in ways other than those described herein. The web browser plug-in according to the present invention facilitates all such Internet research efforts, and all such usage falls within the scope of the present invention.

As used herein, the term "automatic" means "by computer" or "without human intervention." For example, an automatic search is one conducted by, e.g., a web robot, wherein the search and evaluation functions, while programmed into the robot manually, are conducted autonomously by the computer. As another example, a shared URL database management facility that periodically reviews URLs and deletes those with an assigned rank below a predetermined threshold may be described as automatically deleting non-relevant URLs.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of conducting internet research on a topic by a team, comprising:

initiating a preliminary automatic search to generate a preliminary list of URLs related to said topic;

automatically making said URLs available to members of said team via a shared URL database;

automatically notifying said team members when new URLs are added to said shared URL database;

evaluating and ranking said URLs by said team members for relevance to said research topic; and automatically deleting URLs whose relevance rankings fall below a predetermined threshold.

2. The method of claim 1 further comprising:

automatically performing subsequent searches to generate additional URLs; and repeating said steps of making available, notifying, evaluating and deleting with respect to said additional URLs.

3. The method of claim 1 wherein initiating a preliminary automatic search comprises preparing and launching a web robot to perform said preliminary search.

4. The method of claim 1 wherein initiating a preliminary automatic search comprises initiating a preliminary automatic search having predetermined parameters that limit the scope of the search.

5. The method of claim 1 further comprising caching the web sites associated with said URLs for evaluation offline.

6. The method of claim 1 wherein automatically notifying said team members of said URLs comprises sending an electronic message to said team members when said URLs are entered in said central database.

7. The method of claim 6 wherein said electronic message comprises an email message.

8. The method of claim 6 wherein said electronic message comprises an instant messaging message.

9. The method of claim 1 wherein evaluating said URLs comprises categorizing said URLs into a plurality of categories.

10. The method of claim 9 wherein said categories are hierarchical.

11. The method of claim 9 wherein ranking said URLs comprises assigning a category to one or more said team members, and said assigned team members assigning a rank to said URLs following a review of the associated websites.

12. The method of claim 11 wherein said rank comprises a number.

13. The method of claim 12 wherein said number is between 0 and 5, inclusive.

14. The method of claim 12 further comprising graphically indicating said rank in a browser display of said URLs by displaying a corresponding number of graphic icons proximate said URLs.

15. The method of claim 11 wherein automatically deleting non-relevant URLs comprises automatically deleting URLs assigned a rank below a predetermined threshold.

16. The method of claim 15 wherein an indicia of deleted URLs is maintained in a negative match database to preclude repopulation of said shared URL database by the deleted URLs in future searches.

17. The method of claim 1 wherein automatically performing subsequent searches to generate additional URLs comprises preparing and launching one or more web robots to perform said subsequent searches.

18. The method of claim 1 further comprising automatically validating said URLs in said shared URL database.

19. A computer-readable medium that stores computer-executable process steps for facilitating internet research by a team, said computer-executable process steps causing a computer to perform the steps of:

creating and launching one or more web search robots to search the Internet and to return URLs according to predetermined criteria;

making said URLs available to members of said team from a shared URL database;

notifying said team members when new URLs are added to said shared URL database;

selectively allowing access to said shared URL database by team members to evaluate and rank said URLs for relevance to said research topic; and deleting URLs whose relevance rankings fall below a predetermined threshold.

20. The computer-readable medium of claim 19, said computer-executable process steps further causing said computer to perform the steps of:

creating and launching one or more subsequent web search robots to search the Internet and to return additional URLs according to predetermined criteria; and repeating said steps of making available, notifying, evaluating and deleting with respect to said additional URLs.

21. The computer-readable medium of claim 20, wherein said computer-executable process steps are in the form of a web browser plug-in.

* * * * *